(12) United States Patent  
Riepertinger

(10) Patent No.: US 7,752,761 B2  
(45) Date of Patent: Jul. 13, 2010

(54) ANGLE MEASURING ARRANGEMENT

(75) Inventor: Sebastian Riepertinger, Söchtenau (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 12/322,160

(22) Filed: Jan. 29, 2009

(65) Prior Publication Data

US 2009/0199417 A1    Aug. 13, 2009

(30) Foreign Application Priority Data

Feb. 7, 2008    (DE) .................... 10 2008 008 278

(51) Int. Cl.
*G01D 21/00* (2006.01)
*G01D 5/34* (2006.01)
*H01R 13/44* (2006.01)

(52) U.S. Cl. .......................... 33/1 PT; 33/1 N
(58) Field of Classification Search ............... 33/1 PT, 33/1 N, 534, 290; 439/135, 144; 73/862.08
See application file for complete search history.

(56) References Cited

U.S. PATENT DOCUMENTS

| | | | | |
|---|---|---|---|---|
| 5,657,544 A * | 8/1997 | Ota et al. | ...................... | 33/1 N |
| 6,257,907 B1 * | 7/2001 | Feichtinger | ................ | 439/135 |
| 6,617,571 B2 * | 9/2003 | Thaler et al. | ........... | 250/231.13 |
| 6,688,006 B2 * | 2/2004 | Itomi | ........................... | 33/1 N |
| 7,094,079 B2 | 8/2006 | Meyer et al. | | |
| 7,316,071 B2 * | 1/2008 | Harrer | ........................ | 33/1 PT |
| 7,398,699 B2 * | 7/2008 | Itomi | ........................ | 33/1 PT |
| 2001/0034943 A1 * | 11/2001 | Itomi | ........................ | 33/1 N |
| 2002/0023367 A1 * | 2/2002 | Shibuya | ....................... | 33/733 |
| 2004/0244210 A1 * | 12/2004 | Harrer | ........................ | 33/1 PT |
| 2005/0164543 A1 * | 7/2005 | Dang | .......................... | 439/468 |
| 2005/0181649 A1 | 8/2005 | Meyer et al. | | |
| 2006/0131490 A1 * | 6/2006 | Riepertinger | .......... | 250/231.13 |

FOREIGN PATENT DOCUMENTS

EP    1 564 529 B1    1/2008

\* cited by examiner

*Primary Examiner*—Yaritza Guadalupe-McCall
(74) *Attorney, Agent, or Firm*—Brinks Hofer Gilson & Lione

(57) ABSTRACT

An angle measuring arrangement for determining a relative angular position of two components, which are rotatably arranged around an axis of rotation. The angle measuring arrangement including a cap, a connecting cable, including a fixation area having a longitudinal axis and a receptacle device arranged on the cap for receiving the fixation area of the connecting cable. The receptacle device includes an undercut for maintaining the fixation area in a direction with a directional component extending orthogonally with respect to the longitudinal axis. In a position in which the fixation area is fixed in place on the receptacle device, the longitudinal axis of the fixation area lies along a first axis. The longitudinal axis of the fixation area can be introduced into the undercut of the receptacle device by movement along a second axis that is oriented inclined in relation to the first axis.

10 Claims, 2 Drawing Sheets

FIG. 3a (C – C)
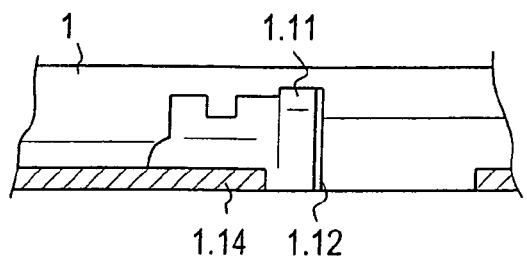
FIG. 3b (D –D)
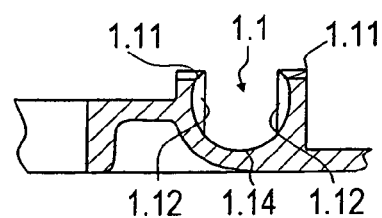
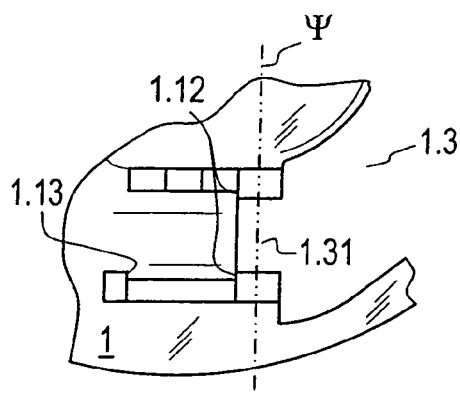
FIG. 3c
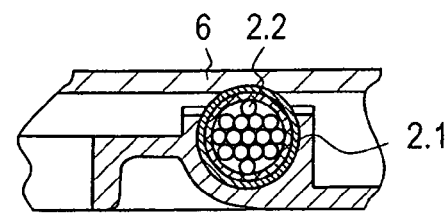
FIG. 5
FIG. 4a
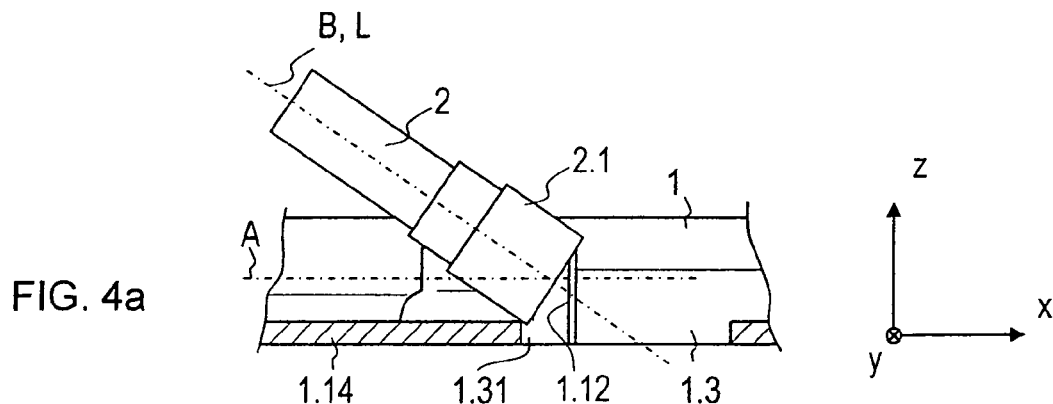
FIG. 4b
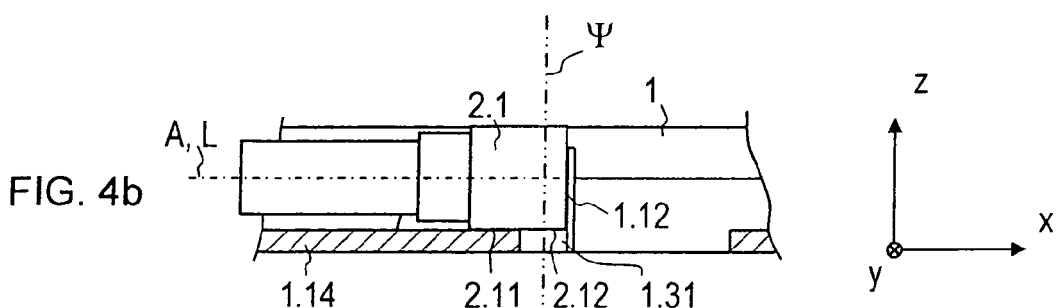

ANGLE MEASURING ARRANGEMENT

RELATED APPLICATIONS

Applicant claims, under 35 U.S.C. §119, the benefit of priority of the filing date of Feb. 7, 2008 of a German patent application, copy attached, Ser. No. 10 2008 008 278.3, filed on the aforementioned date, the entire contents of which is incorporated herein by reference.

BACKGROUND

1. Technical Field

The present invention relates to an angle measuring arrangement for determining the relative angular position of two components, which are rotatably arranged around an axis of rotation.

2. Background Information

Angle measuring arrangements, often also called angle encoders, are used for measuring rotating movements of a rotatably seated body, in particular a shaft, during one or several rotations. Here, the rotating movement is incrementally or absolutely detected. It is also possible to measure linear movements with an angle measuring arrangement in connection with toothed racks and toothed wheels, or threaded spindles.

An operating voltage is supplied to the angle measuring arrangement by means of connecting cables, and the measuring signals are picked up and passed on to an electronic follow-up device. In known angle measuring arrangements an opening is provided in a cap of the angle measuring arrangement, through which the connecting cable is brought to the angle measuring arrangement, where it can be brought into contact with a suitable electrical connecting unit.

An angle measuring arrangement with a device for strain relief of the connecting cable is known from EP 1 564 529 B1 of Applicant. There, strain relief, or a fixing in place of the connecting cable, is achieved by a spring element.

OBJECTS AND SUMMARY OF THE INVENTION

It is an object of the present invention to provide an angle measuring arrangement of the type mentioned at the outset, which makes possible a dependable and quick mounting in a simple manner, and where the angle measuring arrangement is of a construction which can be provided in a cost-efficient manner.

In accordance with the present invention, this object is attained by the creation of an angle measuring arrangement for determining a relative angular position of two components, which are rotatably arranged around an axis of rotation. The angle measuring arrangement includes a cap, a connecting cable, including a fixation area having a longitudinal axis, and a receptacle device arranged on the cap for receiving the fixation area of the connecting cable. The receptacle device includes an undercut for maintaining the fixation area in a direction with a directional component extending orthogonally with respect to the longitudinal axis. In a position in which the fixation area is fixed in place on the receptacle device, the longitudinal axis of the fixation area lies along a first axis. The longitudinal axis of the fixation area can be introduced into the undercut of the receptacle device by movement along a second axis that is oriented inclined in relation to the first axis.

In accordance therewith, the angle measuring arrangement includes a cap, a connecting cable and a receptacle device. On its part, the connecting cable has a fixation area with a longitudinal axis. The receptacle device is arranged at the cap and is used for receiving the fixation area of the connecting cable. In this case, the receptacle device has an undercut for holding the fixation area—in particular in a positive manner—in a direction with a directional component extending orthogonally to the longitudinal axis. This means that the respective holding forces of the undercut are oriented in a direction with a directional component extending orthogonally to the longitudinal axis. In a position, in which the fixation area is fixed in place on, or respectively in the receptacle device, the longitudinal axis of the fixation area comes to extend along, or parallel with, a first axis. The longitudinal axis can furthermore be introduced into the undercut of the receptacle device by a movement along a second axis, so that the second axis is oriented inclined with respect to the first axis.

In the position in which the fixation area is fixed in place on the receptacle device, the connecting cable is already securely fixed in place, for example for the further installation of the angle measuring arrangement.

The receptacle device advantageously has a bottom in which, on the one hand in the position of the fixation area in which the fixation area is fixed in place on the receptacle device, a first section of the fixation area comes to extend on the bottom. Furthermore, a second section of the fixation area is arranged, without touching anything with respect to the bottom, in a geometric plane, which is oriented orthogonally in relation to the longitudinal axis and penetrates the undercut. In other words, the fixed-in-place fixation area is located in the receptacle device in such a way that parts of it do not touch the bottom.

In accordance with a further development of the present invention, the bottom has a cutout which is intersected by a plane in order to achieve the partial contact-free arrangement between the fixation area and the bottom. Here, the cap can advantageously have an opening, through which an electrical coupling arrangement inside the angle measuring arrangement is accessible from outside the cap, in which case the opening can then include the cutout. Thus, the opening has an area, which will be called the cutout in what follows, into which the fixation area can be inserted for the purpose of being introduced into the receptacle device. However, alternatively to this it is also possible for the bottom to be designed in such a way, for example by a step, that the introduction of the fixation area into the receptacle device is also made possible without the cutout.

The receptacle device can furthermore have a detent, which is spatially arranged in such a way that the undercut is arranged between the detent and the bottom in relation to a direction along the first axis. Then, for the axial securing of the connecting cable on both sides, the receptacle device advantageously has two detents in particular.

In a further embodiment of the present invention the receptacle device has a further detent which is spatially arranged in such a way that, in relation to a direction along the first axis, the bottom, or respectively the first section of the fixation area, is arranged between the detent and the undercut.

The angle measuring arrangement is used for determining the relative angular position between two components which can be rotated around an axis of rotation. The receptacle device is designed in such a way that in the position of the fixation area, in which the fixation area is fixed in place on the receptacle device, the longitudinal axis of the fixation area comes to extend in such a way that the orientation of the longitudinal axis differs from the orientation of the axis of rotation. In particular, the receptacle device can then be designed in such a way that the longitudinal axis of the fixation area comes to extend in a plane which is intersected at right angles by the axis of rotation.

It is advantageously possible to produce the cap as a one-piece element with the receptacle device with the aid of a casting process.

In a preferred embodiment variation the angle measuring arrangement is configured in such a way that, following the mounting of a cover, the connecting cable, which has a fixation area, for example a crimping sleeve, is also pressed against the receptacle device by the cover.

Further advantages, as well as details, of the position measuring arrangement in accordance with the present invention ensue from the following description of an exemplary embodiment by the attached drawing figures.

BRIEF DESCRIPTION OF THE DRAWINGS

Shown are in:

FIG. 3a is a partially sectional representation in a plane containing line C-C of the cap of FIG. 1 in the area of the receptacle device of FIG. 1;

FIG. 3b is a partially sectional representation in a plane containing line D-D of the cap of FIG. 1 in the area of the receptacle device of FIG. 1;

FIG. 3c is a view from above on the receptacle device of FIG. 1;

FIG. 4a is a sectional representation of the receptacle device of FIG. 1 in the course of the installation of the connecting cable in accordance with the present invention;

FIG. 4b is a sectional representation of the receptacle device of FIG. 1 following the fixation of the fixation area of the connecting cable on the receptacle device of FIG. 1 in accordance with the present invention; and FIG. 5 is a partially sectional representation D-D in the area of the receptacle device of FIG. 1 following the fixation of the fixation area of the connecting cable on the receptacle device of FIG. 1, with the cover closed in accordance with the present invention.

DETAILED DESCRIPTION OF THE PREFERRED EMBODIMENTS

Figure 1:
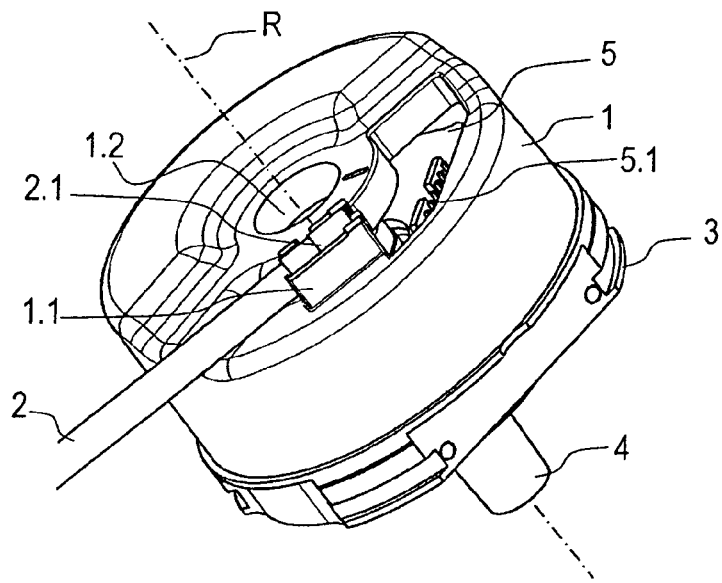
FIG. 1 is a perspective plan view of an embodiment of an angle measuring arrangement with an embodiment of a cap, which includes an embodiment of a receptacle device in accordance with the present invention.

The angle measuring arrangement represented in FIG. 1 has a shaft 4 for a connection with a body to be measured. The connection between the shaft 4 and the body to be measured is for example realized by a connector in the form of a fastening screw extending through the shaft 4.

The angle measuring arrangement itself is fastened to a further body via a base body 3. The body to be measured is for example a motor shaft, and the further body a stationary motor housing. Thus, the angle measuring arrangement is used for the determination of the relative angular position of the base body 3 and the shaft 4 with respect to each other. Such angle measuring arrangements are often called angle encoders.

In a known manner, the shaft 4 is rotatably seated within a base body 3, and a code disk, arranged in the interior of the angle measuring arrangement, is fastened on the shaft 4, and/or the shaft 4 drives one or several code disks by a gear. In the represented example, the code disk is opto-electrically scanned by a scanning device, so that it is possible to record incremental or absolute position information. Appropriate light-sensitive detectors are located on a printed circuit board 5 fastened on the base body 3. Electrical components for generating signals—for example for amplification and digitalization—of the scanning signals provided by the detectors are also arranged, among other components, on the printed circuit board 5. Besides these electronic measuring devices, an electric connecting device, in the represented example a socket 5.1, is moreover arranged on the printed circuit board 5. In the course of final assembly, the socket 5.1, disposed in the interior of the angle measuring arrangement, can be connected with a plug of a connecting cable 2. The plug is attached to the ends of wires 2.2. For the sake of clarity, the representation of the individual wires 2.2 has been omitted in all representations, except for FIG. 5. Therefore the plug connected with the wires 2.2 is not represented in detail either. Incidentally, for dependable signal transmission, the connecting cable 2 is embodied to be shielded and, in the exemplary embodiment represented, has an essentially circular-shaped cross section. When operating the angle measuring arrangement, the connecting cable provides an electrical connection between the angle measuring arrangement and an electronic follow-up device, so that electrical signals and electrical energy can be transmitted.

A cup-shaped cap 1 is provided for the protection of the angle measuring arrangement and its electronic measuring devices, and is clampingly fastened on the circumference of the base body 3. In the represented example, this connection is a pressed connection, in which case the cap 1 can here be furthermore produced in a cost-effective manner as a one-piece part with the aid of a casting process.

The angle measuring arrangement can furthermore be closed off by a cover 6, which is fastened on the cap with a screw in a bore 1.2. The cover 6 is partially sectionally represented only in FIG. 5. At this point, Letters Patent EP 1564529 and U.S. Pat. No. 7,094,079 should be mentioned, in which such a cover is shown, wherein the entire contents of U.S. Pat. No. 7,094,079 are incorporated herein by reference.

Figure 2A:
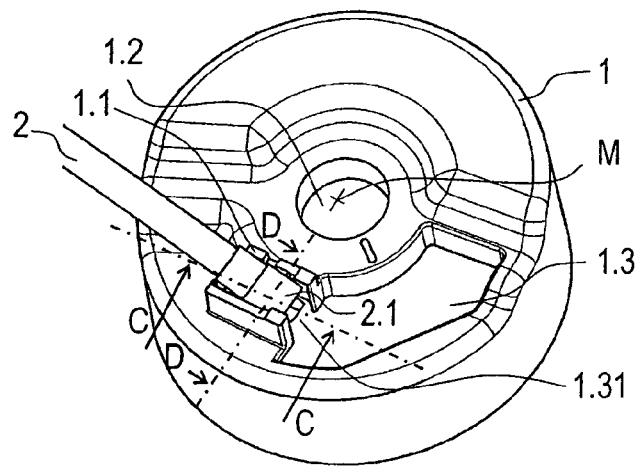
FIG. 2a is a perspective plan view of the cap of FIG. 1 in the course of the installation of a connecting cable in accordance with the present invention.
Figure 2B:
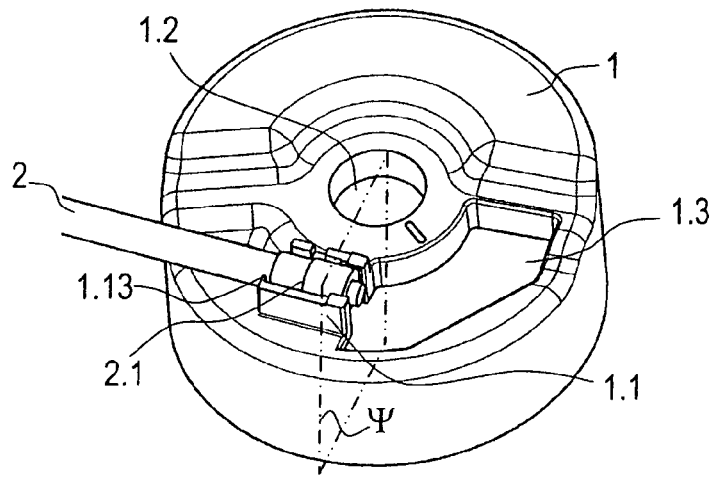
FIG. 2b is a perspective plan view of the cap of FIG. 1 following the fixation of the fixation area of the connecting cable on the receptacle device of FIG. 1 in accordance with the present invention.

The cap 1 of the angle measuring arrangement from FIG. 1 is separately represented without the attached cover 6 in FIGS. 2a and 2b. At its end, the connecting cable 2 has an attachment area which, in the represented exemplary embodiment, is designed as an electrically conductive crimping sleeve 2.1, which is in electrical connection with the shielding of the connecting cable 2. The crimping sleeve 2.1 has a longitudinal axis L (FIGS. 4a, b). The individual leads, or respectively wires 2.2 of the connecting cable 2 protrude from the crimping sleeve 2.1 and, as already mentioned, are not represented in FIGS. 4a, b.

In the exemplary embodiment represented, an aluminum pressure-molded alloy was used as the material for the cap 1, as well as for the cover 6. However, alternatively to this it is also possible to employ an electrically conductive plastic material, or a plastic material coated to be electrically conductive, in particular an extrusion-molded part.

The cup-shaped cap 1 has an essentially hollow-cylindrical shape, in which a front face of the hollow cylinder is completely open. The corresponding, oppositely-located front face, also called the back wall, has a central bore 1.2 and an off-centered opening 1.3. This opening 1.3 lies completely outside of the center M (FIG. 2a) of the back wall, i.e. the edge of the opening 1.3 does not enclose the center M. The opening 1.3 has an area which will be called cutout 1.31 in what follows. For a simple connection and exchange of the connecting cable 2, the wires 2.2, together with the plug, are passed through this opening 1.3 of the cap 1, so that the plug can be pushed into the socket 5.1 arranged on the printed circuit board 5 inside the angle measuring arrangement.

The cap 1 furthermore includes a receptacle device 1.1 as an integral part. With the cover 6 already opened, the connecting cable 2 is fixed in place on the fixation area of the former, or respectively on its crimping sleeve, with the aid of the receptacle device 1.1 at the cap 1, so that the connecting cable 2 is secured, or respectively the electrical coupling device is relieved of strain. The receptacle device 1.1 is matched to the shape of the crimping sleeve 2.1. In accordance with FIGS. 3*a* to 3*c*, the receptacle device 1.1 includes an undercut 1.11, two detents 1.12, as well as a further detent 1.13 and a so-called bottom 1.14. Thus, the cutout 1.31 can also be considered a cutout 1.31 of the bottom 1.14.

In regard to the fixation in place of the connecting cable 2 on the cap 1, the orientation of the crimping sleeve 2.1 during the different mounting phases is of particular importance. For further explanation, a first axis A and a second axis B have been defined in this connection. In the course of mounting of the connecting cable 2, it is first inserted obliquely into the receptacle device 1.1 in accordance with FIG. 2*a*. In accordance with FIG. 4*a*, the connecting cable 2, or respectively the crimping sleeve 2.1, is here moved along an inclined second axis B, so that in this phase the second axis B coincides with the longitudinal axis L of the crimping sleeve 2.1. The connecting cable 2 is displaced along the second axis B (to the right in FIG. 4*a*) until the crimping sleeve 2.1 encounters the detents 1.12 of the receptacle device 1.1. In this position the front edge of the crimping sleeve 2.1 descends into the cutout 1.31, so that the front area of the crimping sleeve 2.1 as a whole can enter into the undercut 1.11.

In the next step, the crimping sleeve 2.1 is pivoted around a straight line parallel with respect to the y-axis in accordance with FIGS. 4*a, b*, until finally the longitudinal axis L of the crimping sleeve 2.1 coincides with the first axis A. Here, the axis A is oriented parallel with respect to the x-axis of the coordinate system in FIGS. 4*a, b*. In this position in accordance with FIG. 4*b*, the crimping sleeve 2.1 is in a position in which the crimping sleeve 2.1, and therefore also the connection cable 2, is in principle already fixed in place on the receptacle device 1.1. The undercut 1.11 now extends around crimping sleeve 2.1 in such a way that the latter is maintained in a direction parallel with respect to the axis of rotation R, or respectively orthogonally to the longitudinal axis L. Therefore the respective holding forces act parallel with respect to the z-axis in FIG. 4*b*. Moreover, in this position the crimping sleeve 2.1 comes to lie along the first axis A, or respectively the x-axis, in the receptacle device 1.1. Because of the oblique introduction direction, the second axis B is therefore oriented inclined in relation to the first axis A.

With respect to the longitudinal axis L, or respectively the first axis A, the detents 1.12 prevent an axial movement of the crimping sleeve 2.1 in a first direction, here in the x-direction. In this case the undercut 1.11 is spatially arranged in relation to the direction along the first axis A in such a way that it is arranged between the detents 1.12 and the bottom 1.14.

So that the crimping sleeve 2.1 is also axially secured in a second direction (x-direction) with respect to the longitudinal direction L, or respectively the first axis A, the receptacle device 1.1 has a protrusion 1.13 as a further detent, which extends around the crimping sleeve 2.1 in a position, in which the crimping sleeve 2.1 is fixed in place on the receptacle device 1.1. Here, with respect to a direction along the first axis A, or respectively the x-direction, the bottom 1.14 is arranged between the protrusion 1.13 and the undercut 1.11.

Because of the geometric design of the crimping sleeve 2.1 and the receptacle device 1.1, it is furthermore assured that the connecting cable 2 is also maintained in a positive manner in the y-direction, such as can also be seen, for example, in FIG. 5.

Therefore the crimping sleeve 2.1, and therefore the connecting cable 2, can be fixed in place in all directions by the receptacle device 1.1. A highly effective strain relief is created for the electrical coupling connection, so that in the course of further assembly the release of the connection between the socket 5.1 and the plug is effectively prevented.

The fixed-in-place crimping sleeve 2.1 includes a first section 2.11, which rests on the bottom 1.14 of the receptacle device 1.1. Viewed geometrically, it is possible to define a plane $\Psi$, which is orthogonally oriented in relation to the longitudinal axis L of the crimping sleeve 2.1 in the position in which the latter has been fixed in place on the receptacle device 1.1, and which simultaneously passes through the undercut 1.11. Thus, this plane $\Psi$ is oriented parallel with respect to the y-z-plane in accordance with the coordinate system in FIG. 4*b*, or respectively is oriented in such a way that it comes to lie parallel in relation to the axis of rotation R. A second section 2.12 of the crimping sleeve 2.1 is located in this plane $\Psi$ and is arranged to be free of contact with the bottom 1.14. In other words, the second section 2.12 does not come into contact with the bottom 1.14 in the plane $\Psi$. In contrast thereto, outside of the plane $\Psi$ the first section 2.11 of the crimping sleeve 2.1 rests on, and is in contact with, the bottom 1.14 of the receptacle device 1.1.

Furthermore, in the position in which the crimping sleeve 2.1 is fixed in place on the receptacle device 1.1, it is oriented orthogonally with respect to the axis of rotation R, or respectively comes to lie in a plane which is intersected at right angles by the axis of rotation R.

The positive fixation of the connecting cable 2 on the cap 1 when the cover 6 is open is primarily used for the simple installation of the angle measuring arrangement, in particular for a simple dependable provision of the plug connection between the connecting cable 2 and the printed circuit board 5 in the interior of the angle measuring arrangement. After the plug connection of the fixed-in-place connecting cable 2 has been provided, the cover 6 is fastened on the cap 1. A screw is passed through an appropriate hole in the cover 6 for this purpose and is turned into the central bore 1.2, which has an interior thread, of the cap 1. The cover 6 is used, inter alia, for closing the opening 1.3. Moreover, the cover 6 also extends around the crimping sleeve 2.1 and the receptacle device of the cap 1. The structural components enclosed by the cover 6 are covered by it on all sides, at least in a dust-proof manner against the surroundings, and are shielded against electromagnetic fields. For creating a tight connection between the cover 6 and the back wall of the cap 1, the lateral edges of the cover 6 extend as far as the surface of the rear wall, or respectively as far as the lateral wall of the cap 1.

In accordance with FIG. 5, a force is introduced into the crimping sleeve 2.1 also by the closed cover 6 because of the special design of the cover 6, which presses the crimping sleeve 2.1 against the receptacle device 1.1 and therefore assures an increased dependable contactability of the shielded connection. In other words, following the closing of the cover 6, the latter generates a force, which presses the connecting cable 2 against the cap 1 for further strain relief. The permissible tension forces for strain relief are increased by this step.

Thus, the crimping sleeve 2.1 provides an electrical connection between the shielding of the connecting cable 2 and the cap 1, inclusive of the cover 6. By this, the cap 1 can be connected via the connecting cable 2 in a simple manner with the reference potential of an electronic follow-up device (counter, control).

The foregoing description is provided to illustrate the present invention, and is not to be construed as a limitation. Numerous additions, substitutions and other changes can be made to the present invention without departing from its scope as set forth in the appended claims.

I claim:

1. An angle measuring arrangement for determining a relative angular position of two components, which are rotatably arranged around an axis of rotation, the angle measuring arrangement comprising:
   a cap;
   a connecting cable, including a fixation area having a longitudinal axis; and
   a receptacle device arranged on said cap for receiving said fixation area of said connecting cable, wherein said receptacle device comprises an undercut for maintaining said fixation area in a direction with a directional component extending orthogonally with respect to said longitudinal axis;
   wherein in a position in which said fixation area is fixed in place on said receptacle device, said longitudinal axis of said fixation area lies along a first axis; and
   wherein said longitudinal axis of said fixation area can be introduced into said undercut of said receptacle device by movement along a second axis that is oriented inclined in relation to said first axis.

2. The angle measuring arrangement in accordance with claim 1, wherein said receptacle device comprises a bottom, and in which in a position in which said fixation area is fixed in place on said receptacle device the following conditions are met:
   a) a first section of said fixation area comes to lie on said bottom, and
   b) a second section of said fixation area is oriented in a geometric plane, which is oriented orthogonally in relation to said longitudinal axis and penetrates said undercut and is arranged without contact with said bottom.

3. The angle measuring arrangement in accordance with claim 2, in which, for achieving partial freedom from contact between said fixation area and said bottom, said bottom has a cutout, which said geometric plane intersects.

4. The angle measuring arrangement in accordance with claim 3, in which said cap has an opening, through which an electrical coupling device is accessible, and said opening includes said cutout.

5. The angle measuring arrangement in accordance with claim 1, in which said receptacle device has a detent, which is arranged in such a way that, in regard to a direction along said first axis, said undercut is arranged between said detent and said bottom.

6. The angle measuring arrangement in accordance with claim 5, in which said receptacle device has two detents for the axial securing of said connecting cable on both sides.

7. The angle measuring arrangement in accordance with claim 1, in which said receptacle device has a detent, which is arranged in such a way that, with respect to a direction along said first axis, said bottom is arranged between said detent and said undercut.

8. The angle measuring arrangement in accordance with claim 1, in which said receptacle device is designed in such a way that, in a position of said fixation area, in which said fixation area is fixed in place on said receptacle device, said longitudinal axis comes to lie in such a way, that an orientation of said longitudinal axis differs from an orientation of said axis of rotation.

9. The angle measuring arrangement in accordance with claim 8, in which said receptacle device is designed in such a way that said longitudinal axis of said fixation area comes to lie in a plane, which is intersected at right angles by said axis of rotation.

10. The angle measuring arrangement in accordance with claim 1, in which said cap is manufactured in one piece via a casting process.

* * * * *